(12) United States Patent
Rabinovitch et al.

(10) Patent No.: US 8,898,433 B2
(45) Date of Patent: Nov. 25, 2014

(54) EFFICIENT EXTRACTION OF EXECUTION SETS FROM FETCH SETS

(75) Inventors: Alexander Rabinovitch, Kfar Yona (IL); Leonid Dubrovin, Karney Shomron (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 160 days.

(21) Appl. No.: 13/456,495

(22) Filed: Apr. 26, 2012

(65) Prior Publication Data
US 2013/0290677 A1 Oct. 31, 2013

(51) Int. Cl.
*G06F 9/38* (2006.01)

(52) U.S. Cl.
CPC ............ *G06F 9/3816* (2013.01); *G06F 9/3814* (2013.01)
USPC .......................................................... 712/24

(58) Field of Classification Search
USPC .................................................. 712/206, 208
See application file for complete search history.

(56) References Cited

U.S. PATENT DOCUMENTS

| | | | | |
|---|---|---|---|---|
| 5,475,853 A | * | 12/1995 | Blaner et al. | 712/213 |
| 5,845,101 A | * | 12/1998 | Johnson et al. | 712/207 |
| 6,122,729 A | * | 9/2000 | Tran | 712/244 |
| 6,148,111 A | * | 11/2000 | Creusere | 382/240 |
| 6,237,074 B1 | * | 5/2001 | Phillips et al. | 711/213 |
| 6,418,527 B1 | * | 7/2002 | Rozenshein et al. | 712/208 |
| 6,539,470 B1 | * | 3/2003 | Mahurin et al. | 712/208 |
| 6,604,191 B1 | * | 8/2003 | Flacks et al. | 712/207 |
| 6,832,307 B2 | * | 12/2004 | Richardson | 712/213 |
| 6,850,105 B1 | | 2/2005 | Rishin | 327/202 |
| 6,892,293 B2 | * | 5/2005 | Sachs et al. | 712/215 |
| 7,020,769 B2 | | 3/2006 | Goodrich | 712/241 |
| 7,089,408 B2 | * | 8/2006 | Check et al. | 712/225 |
| 7,327,789 B2 | * | 2/2008 | Horiike et al. | 375/240.25 |
| 7,360,023 B2 | | 4/2008 | Goodrich | 711/128 |
| 7,805,589 B2 | * | 9/2010 | Du et al. | 711/220 |
| 2008/0046704 A1 | * | 2/2008 | Tanaka et al. | 712/241 |

OTHER PUBLICATIONS

Lu Wan et al., A Novel Method in design Optimization of Instruction Decoder and Micro-control Unit for ILP DSPs, 2003 IEEE, p. 417-423. 5th International Conference in ASIC.*

* cited by examiner

*Primary Examiner* — Eric Coleman
(74) *Attorney, Agent, or Firm* — Christopher P. Maiorana, PC

(57) ABSTRACT

An apparatus having a buffer and a circuit is disclosed. The buffer may be configured to store a plurality of fetch sets. Each fetch set generally includes a prefix word and a plurality of instruction words. Each prefix word may include a plurality of symbols. Each symbol generally corresponds to a respective one of the instruction words. The circuit may be configured to (i) identify each of the symbols in each of the fetch sets having a predetermined value and (ii) parse the fetch sets into a plurality of execution sets in response to the symbols having the predetermined value.

20 Claims, 6 Drawing Sheets

US 8,898,433 B2

EFFICIENT EXTRACTION OF EXECUTION SETS FROM FETCH SETS

FIELD OF THE INVENTION

The present invention relates to digital signal processors generally and, more particularly, to a method and/or apparatus for implementing an efficient extraction of execution sets from fetch sets.

BACKGROUND OF THE INVENTION

Some modern digital signal processor (i.e., DSP) cores use very long instruction word (i.e., VLIW) architectures. Such architectures assume that instruction scheduling is done in software either by an assembly programmer or by a compiler. In the VLIW approaches, parallelism is statically encoded using variable length execution sets (i.e., VLES). In modern DSPs, each VLES can encode as many as 12 instructions. Furthermore, each VLES may include several prefix words added by the assembler. Each VLES also provides a high code density by using 16 or 32 bits for instructions.

Referring to FIG. 1, a diagram illustrating conventional order for fetching and dispatching several variable length execution sets is shown. Shading in the blocks identify instructions belonging to different sets. A new fetch set is read on each cycle (i.e., cycles 1-4) and subsequently dispatched (e.g., cycles 2-7).

A problem commonly exists in the VLES dispatch decoding time. During a single cycle, a dispatcher determines which instructions belong to a specific VLES being dispatched. In conventional implementations, the dispatcher works on each instruction in each fetch set in parallel to complete the dispatch decoding in a single cycle. Therefore, a large number of parallel decoders are normally implemented. In particular, eight decoders are provided for an 8-word fetch set case and 16 decoders are provided for a 16-word fetch set case. Implementing multiple parallel decoders utilizes a significant amount of logic, which increases chip area and power consumption.

The VLES dispatching is also a limiting issue of a DSP core frequency. The DSP core frequency is governed by the time used in the dispatch procedure to complete work on each VLES. Limiting the core frequency such that a current VLES is completed in a single cycle allows a next VLES pipeline to start in a next cycle.

It would be desirable to implement an efficient extraction of execution sets from fetch sets.

SUMMARY OF THE INVENTION

The present invention concerns an apparatus having a buffer and a circuit. The buffer may be configured to store a plurality of fetch sets. Each fetch set generally includes a prefix word and a plurality of instruction words. Each prefix word may include a plurality of symbols. Each symbol generally corresponds to a respective one of the instruction words. The circuit may be configured to (i) identify each of the symbols in each of the fetch sets having a predetermined value and (ii) parse the fetch sets into a plurality of execution sets in response to the symbols having the predetermined value.

The objects, features and advantages of the present invention include providing a method and/or apparatus for an efficient extraction of execution sets from fetch sets that may (i) use a prefix word in each fetch set to simplify VLES dispatching, (ii) use bit-enabled VLES start encoding to simplify VLES dispatching, (iii) add special prefix words to at the start of each fetch set, (iv) implement a single decoder for instructions and/or (v) be implemented in a digital signal processor.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention provide a mechanism to improve timing, area and power consumption of a digital signal processor (e.g., DSP) core to dispatch variable length execution sets (e.g., VLES). Each VLES generally contains multiple instruction words parsed, decoded and transferred to multiple arithmetic logic units (e.g., ALU) for execution.

Figure 1:
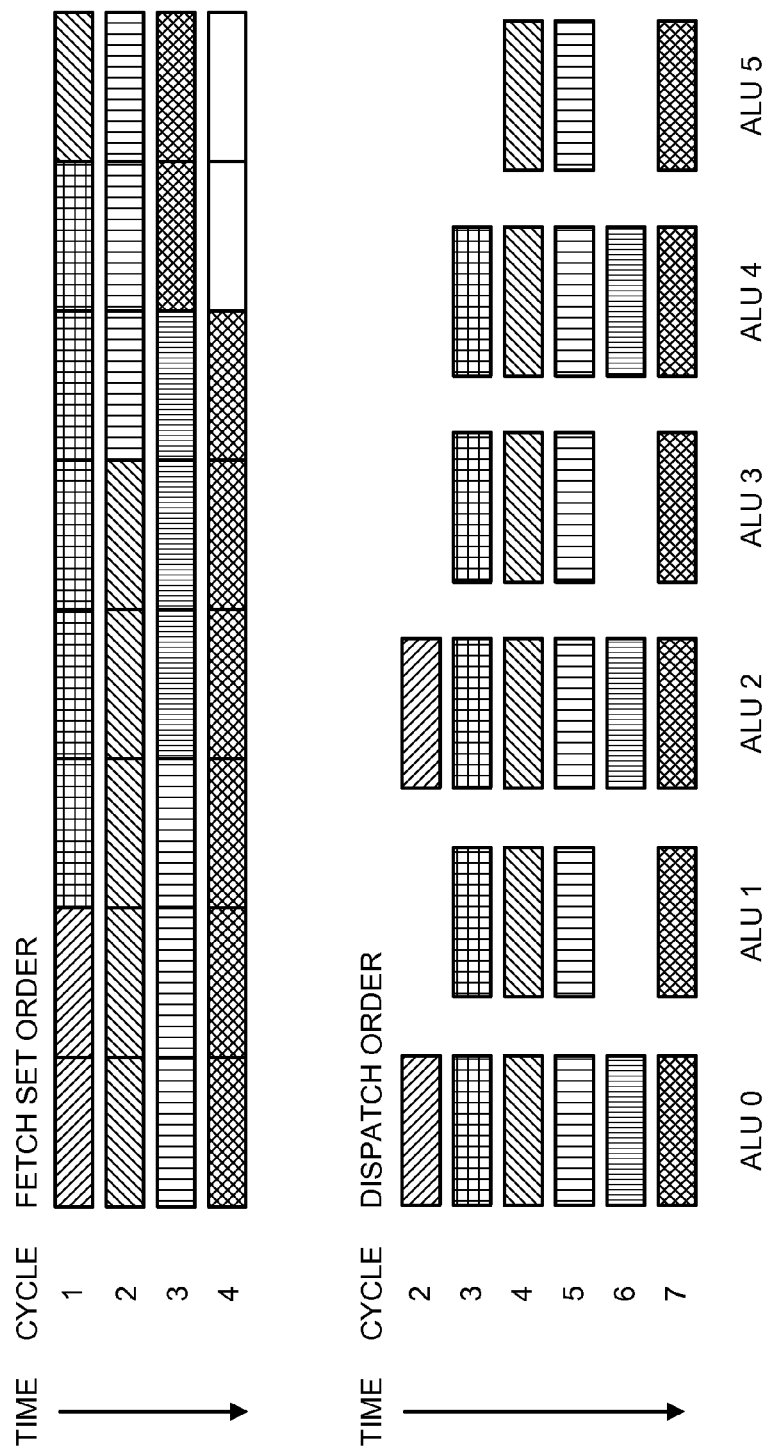
FIG. 1 is a diagram illustrating a conventional order for fetching and dispatching several variable length execution sets.
Figure 2:
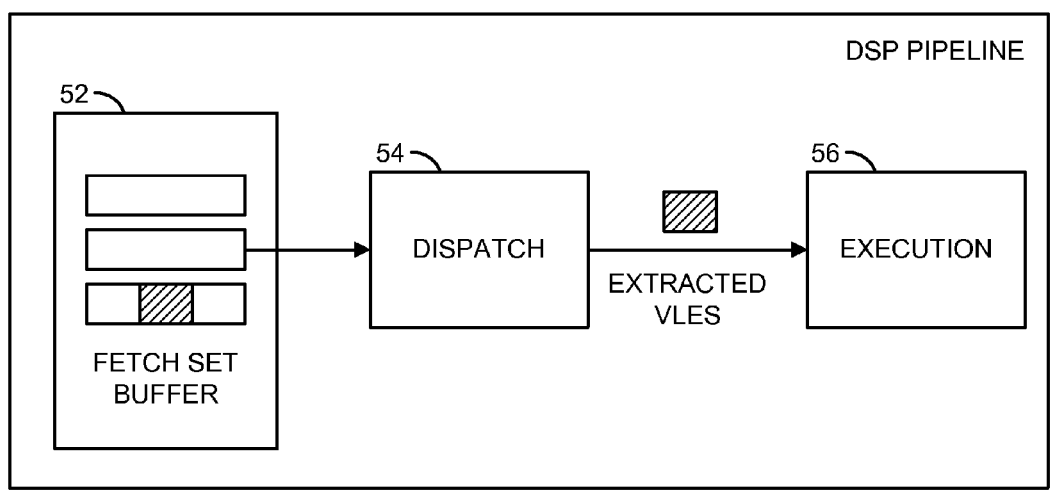
FIG. 2 is a flow diagram of an example method for variable length execution set dispatching.

Referring to FIG. 2, a flow diagram of an example method 50 for VLES dispatching is shown. The method (or process) 50 may be implement in a DSP core pipeline. The method 50 generally comprises a step (or state) 52, a step (or state) 54 and a step (or state) 56. The steps 52 to 56 may represent modules and/or blocks that may be implemented as hardware, software, a combination of hardware and software, or other implementations.

In general, a software program is read from an instruction memory into a fetch set buffer in the step 52 using wide accesses to aligned data. The data is commonly called a fetch set. Each fetch set generally has a constant size for the data which may be defined by a core program bus width (e.g., 128, 256, or 512 bits). Other bus widths may be implemented to meet the criteria of a particular application.

Each fetch set may contain one or more variable length execution sets. The variable length execution sets may also cross fetch set boundaries. Thus, a single variable length execution set may be read from the instruction memory in multiple fetch sets. No inter-VLES padding is generally provided between sequential variable length execution sets and therefore a high code density may be achieved.

In the step 54, the individual variable length execution sets within the fetch sets may be extracted, decoded and dispatched from the fetch set buffer to multiple ALUs. The ALUs may execute each instruction word in each variable length execution set in parallel (or simultaneously) in the step 56.

Figure 3:
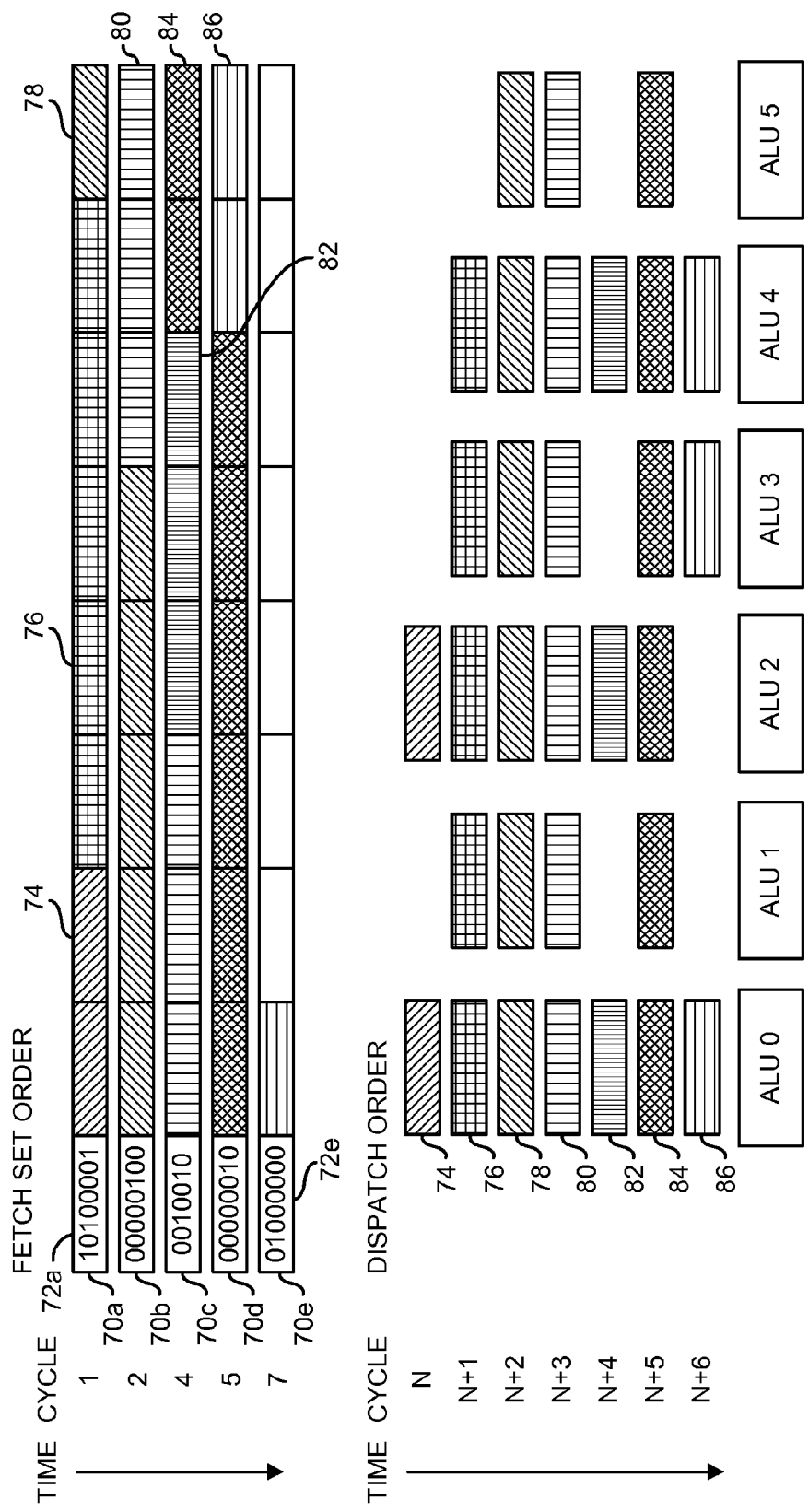
FIG. 3 is a diagram illustrating an order for fetching and dispatching according to a fetch set prefix.

Referring to FIG. 3, a diagram illustrating an order for fetching and dispatching according to a fetch set prefix is shown. The fetch set prefix may be included in each fetch set read into the fetch set buffer. The prefix generally comprises one or several words in predetermined positions within each fetch set (e.g., at the beginning of each fetch set). The information (or symbols) contained in the prefix words may be used to simplify the dispatching process.

In the illustrated example, multiple fetch sets 70a-70e may be read in a fetch set order from the instruction memory into the fetch set buffer. The reading from the instruction memory may be performed sequentially with or without gaps between the cycles (e.g., cycles 1-7). Each fetch set 70a-70e may contain a respective prefix word 72a-72e.

Each fetch set 70a-70e may match the width (e.g., 136 bits) of the core program bus width. Each prefix word 72a-72e and each instruction word may have a set width (e.g., 16 bits). Other widths of the fetch sets 70a-70e, the prefix words 72a-72e and the instruction words may be implemented to meet the criteria of a particular application.

In the example, the fetch set 70a may include the prefix word 72a, all of a VLES 74, all of a VLES 76 and an initial portion of a VLES 78. The fetch set 70b may include the prefix word 72b, a remaining portion of the VLES 78 and an initial portion of a VLES 80. The fetch set 70c may include the prefix word 72c, a remaining portion of the VLES 80, all of a VLES 82 and an initial portion of a VLES 84. The fetch set 70d may include the prefix word 72d, a remaining portion of the VLES 84 and an initial portion of a VLES 86. The fetch set 70e may include the prefix word 72e and a remainder of the VLES 86.

The variable length execution sets 74-86 may be extracted from the fetch sets 70a-70e in the step 54. In general, a single VLES may be dispatched to the ALU 0-ALU 5 in each cycle (e.g., the cycles N to N+5). For example, the two instruction words of the VLES 74 may be dispatched to the ALU 0 and the ALU 2 in the cycle N. The five instruction words of the VLES 76 may be dispatched to ALU 0-ALU 4 in the cycle N+1. The six instruction words of the VLES 78 may be dispatched to ALU 0-ALU 5 in the cycle N+2, and so on. In some embodiments of the pipeline, the execution stage(s) may occur after the dispatch stage and thus N=2. In other embodiments of the pipeline, one or more other stages may reside between the dispatch stage(s) and the execution stage(s) and thus N may be greater than 2.

Each prefix word 72a-72e generally comprises multiple symbols (e.g., multiple bits), a single symbol corresponding to each respective instruction word in the corresponding fetch set 70a-70e. Each symbol may have either a predetermined start value (e.g., a "1" value) or a predetermined continuation value (e.g., a "0") value. A symbol with the start value may signify that (i) the corresponding instruction word is an initial instruction word of a new execution set and/or (ii) the previous instruction word was a final instruction word in a previous VLES. A symbol with the continuation value may signify that the corresponding instruction word is either a continuation of a current execution set already identified by a start value, or a null (or unused) instruction word. For example, the prefix word 72a contains three start values at positions 1, 3 and 8, reading left to right. The three start values may identify the beginnings of the VLES 74, the VLES 76 and the VLES 78, respectively. The remaining symbols within the prefix word 72a may have the continuation values to signify the subsequent instruction words in the VLES 74, the VLES 76 and the VLES 78.

For situations where a VLES is a last VLES in a fetch set (e.g., the VLES 86 in fetch set 70e), the symbol corresponding to the next instruction word position (e.g., position 2) may be set to the start value only to signify the end of the last VLES 86. In some embodiments, other values (e.g., a "2" value) may be coded into the symbols to indicate that the previous VLES has ended and no new VLES exists in the current fetch set. Hence, each symbol may be represented as one or more bits in the prefix words.

Usage of the prefix words 72a-72e generally removes a dependency between multiple dispatches of multiple execution sets. Since the symbols in the prefix words 72a-72e identify the boundaries of each VLES, the dispatcher may identify where the next VLES begins before a finishing an extraction of a current VLES from the fetch sets. Thus, the dispatcher may work on all variable length execution sets in a fetch set in parallel and/or start working on the next fetch set in advance. The parallel approach generally allows splitting the dispatching process into two or more stages. Using multiple stages may permit the DSP core cycles to operate at a higher frequency, reduce the silicon area and reduce power consumption by using multiplexers to route the instructions to a single decoder instead of an array of parallel decoders.

Figure 4:
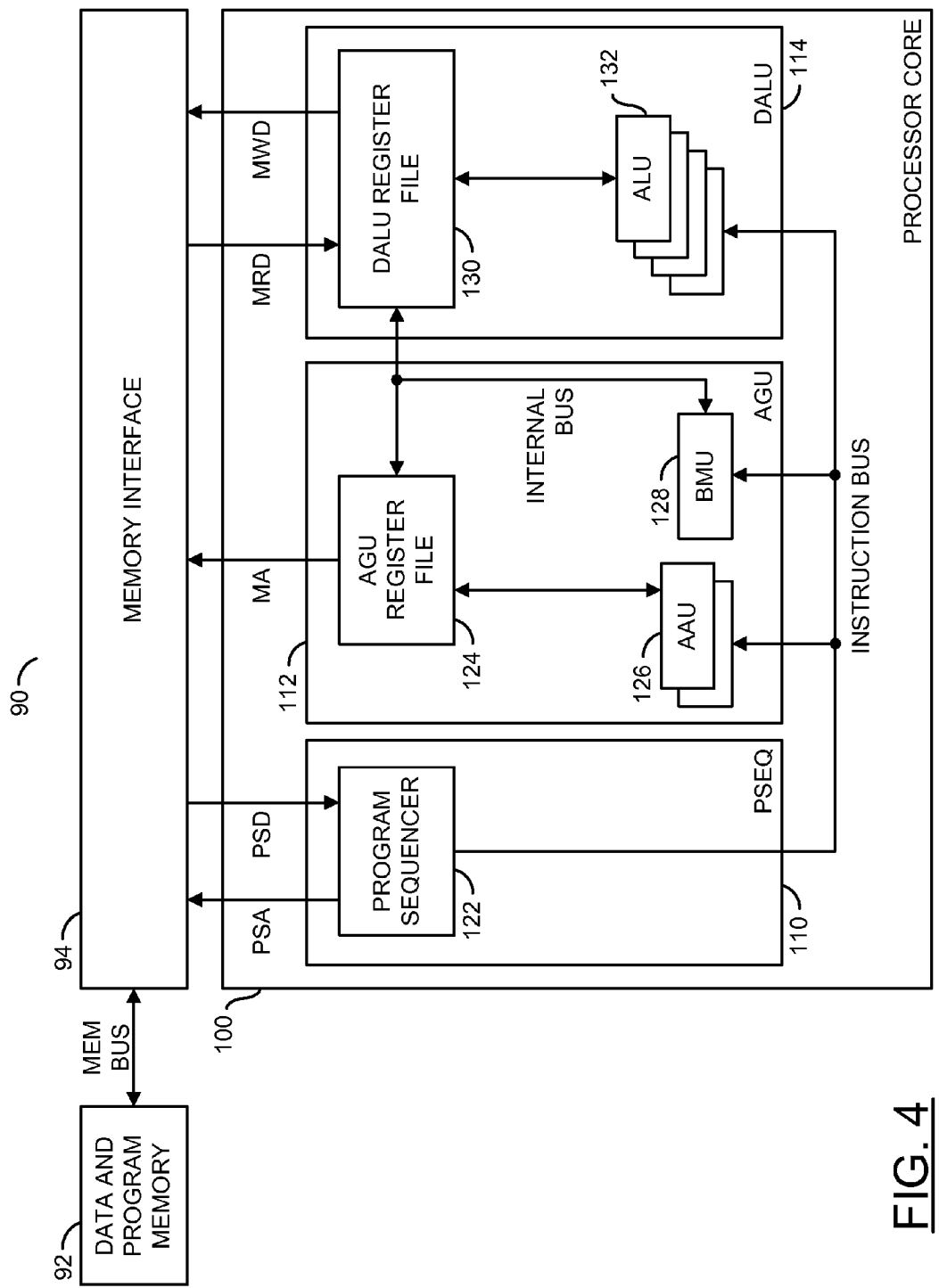
FIG. 4 is a block diagram of a pipelined digital signal processor circuit.

Referring to FIG. 4, a block diagram of a circuit (or block) 90 is shown. The circuit (or apparatus or device or integrated circuit) 90 may implement a pipelined digital signal processor circuit. The circuit 90 generally comprises a block (or circuit) 92, a block (or circuit) 94 and the circuit 100. The circuit 100 generally comprises a block (or circuit) 110, a block (or circuit) 112 and a block (or circuit) 114. The circuit 110 generally comprises a block (or circuit) 122. The circuit 112 generally comprises a block (or circuit) 124, one or more blocks (or circuits) 126 and a block (or circuit) 128. The circuit 114 generally comprises a block (or circuit) 130 and one or more blocks (or circuits) 132. The circuits 92-132 may represent modules and/or blocks that may be implemented as hardware, software, a combination of hardware and software, or other implementations. In some embodiments, the circuit 94 may be part of the circuit 100.

A bus (e.g., MEM BUS) may connect the circuit 94 and the circuit 92. A program sequence address signal (e.g., PSA) may be generated by the circuit 122 and transferred to the circuit 94. The circuit 94 may generate and transfer a program sequence data signal (e.g., PSD) to the circuit 122. A memory address signal (e.g., MA) may be generated by the circuit 124 and transferred to the circuit 94. The circuit 94 may generate a memory read data signal (e.g., MRD) received by the circuit 130. A memory write data signal (e.g., MWD) may be generated by the circuit 130 and transferred to the circuit 94. A bus (e.g., INTERNAL BUS) may connect the circuits 124, 128 and 130. A bus (e.g., INSTRUCTION BUS) may connect the circuits 122, 126, 128 and 132.

The circuit 92 may implement a memory circuit. The circuit 92 is generally operational to store both data and instructions used by and generated by the circuit 100. In some embodiments, the circuit 92 may be implemented as two or more circuits with some storing the data and others storing the instructions.

The circuit 94 may implement a memory interface circuit. The circuit 94 may be operational to transfer memory addresses and data between the circuit 92 and the circuit 100. The memory address may include instruction addresses in the signal PSA and data addresses in the signal MA. The data may include instruction data (e.g., the fetch sets) in the signal PSD, read data in the signal MRD and write data in the signal MWD.

The circuit 100 may implement a processor core circuit. The circuit (or apparatus) 100 is generally operational to execute (or process) instructions received from the circuit 92. Data consumed by and generated by the instructions may also be read (or loaded) from the circuit 92 and written (or stored) to the circuit 92. The pipeline within the circuit 100 may implement a software pipeline. In some embodiments, the pipeline may implement a hardware pipeline. In other embodiments, the pipeline may implement a combined hardware and software pipeline.

The circuit 110 may implement a program sequencer (e.g., PSEQ) circuit. The circuit 110 is generally operational to generate a sequence of addresses in the signal PSA for the instructions executed by the circuit 100. The addresses may be presented to the circuit 94 and subsequently to the circuit 92. The instructions may be returned to the circuit 110 in the fetch sets read from the circuit 92 through the circuit 94 in the signal PSD.

Figure 5:
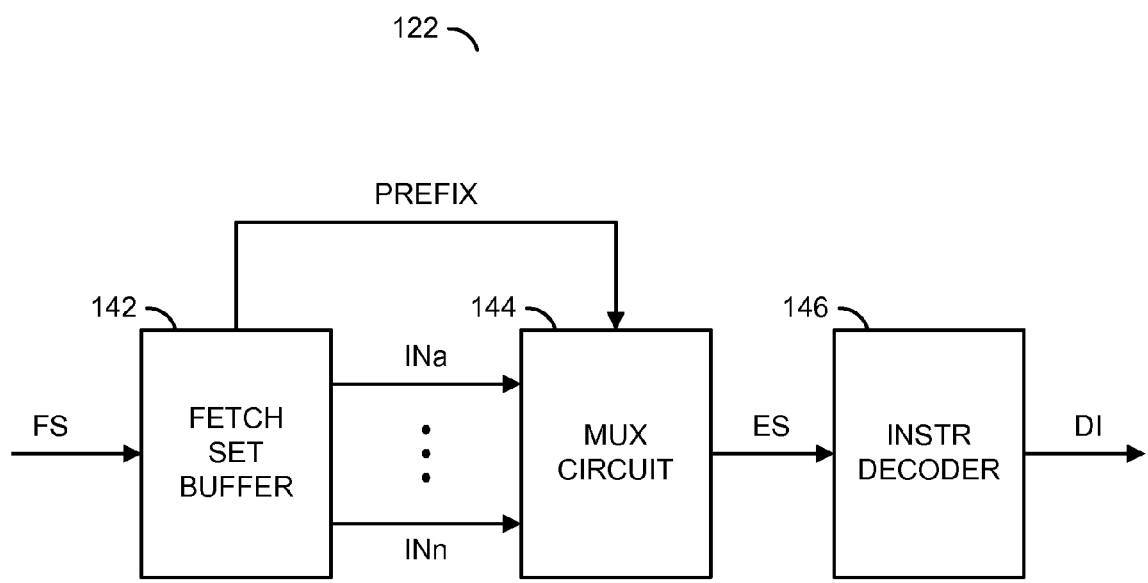
FIG. 5 is a partial block diagram of an example implementation of a circuit in accordance with a preferred embodiment of the present invention.

The circuit 110 is generally configured to store the fetch sets received from the circuit 92 via the signal PSD in the buffer (e.g., a circuit 142 in FIG. 5). The circuit 110 may also identify each symbol in each fetch set having the start value. Once the positions of the start values are known, the circuit 110 may parse the fetch sets into execution sets in response to the symbols having the start value. The instruction words in the execution sets may be decoded within the circuit 110 (e.g., using a circuit 146 in FIG. 5) and presented on the instruction bus to the circuits 126, 128 and 132.

The circuit 112 may implement an address generation unit (e.g., AGU) circuit. The circuit 112 is generally operational to generate addresses for both load and store operations performed by the circuit 100. The addresses may be issued to the circuit 94 via the signal MA.

The circuit 114 may implement a data arithmetic logic unit (e.g., DALU) circuit. The circuit 114 is generally operational to perform core processing of data based on the instructions fetched by the circuit 110. The circuit 114 may receive (e.g., load) data from the circuit 92 through the circuit 94 via the signal MRD. Data may be written (e.g., stored) through the circuit 94 to the circuit 92 via the signal MWD.

The circuit 122 may implement a program sequencer circuit. The circuit 122 is generally operational to prefetch a set of one or more addresses by driving the signal PSA. The prefetch generally enables memory read processes by the circuit 94 at the requested addresses. While an address is being issued to the circuit 92, the circuit 122 may update a fetch counter for a next program memory read. Issuing the requested address from the circuit 94 to the circuit 92 may occur in parallel to the circuit 122 updating the fetch counter.

The circuit 124 may implement an AGU register file circuit. The circuit 124 may be operational to buffer one or more addresses generated by the circuits 126 and 128. The addresses may be presented by the circuit 124 to the circuit 94 via the signal MA.

The circuit 126 may implement one or more (e.g., two) address arithmetic unit (e.g., AAU) circuits. Each circuit 126 may be operational to perform address register modifications. Several addressing modes may modify the selected address registers within the circuit 124 in a read-modify-write fashion. An address register is generally read, the contents modified by an associated modulo arithmetic operation, and the modified address is written back into the address register from the circuit 126.

The circuit 128 may implement a bit-mask unit (e.g., BMU) circuit. The circuit 128 is generally operational to perform multiple bit-mask operations. The bit-mask operations generally include, but are not limited to, setting one or more bits, clearing one or more bits and testing one or more bits in a destination according to an immediate mask operand.

The circuit 130 may implement a DALU register file circuit. The circuit 130 may be operational to buffer multiple data items received from the circuits 92, 128 and 132. The read data may be receive from the circuit 92 through the circuit 94 via the signal MRD. The signal MWD may be used to transfer the write data to the circuit 92 via the circuit 94.

The circuit 132 may implement one or more (e.g., eight) arithmetic logic unit (e.g., ALU) circuits. Each circuit 132 may be operational to perform a variety of arithmetic operations on the data stored in the circuit 130. The arithmetic operations may include, but are not limited to, addition, subtraction, shifting and logical operations.

Referring to FIG. 5, a partial block diagram of an example implementation of the circuit 122 is shown in accordance with a preferred embodiment of the present invention. The apparatus 122 generally comprises a block (or circuit) 142, a block (or circuit) 144 and a block (or circuit) 146. The circuits 142 to 146 may represent modules and/or blocks that may be implemented as hardware, software, a combination of hardware and software, or other implementations.

A signal (e.g., FS) conveying the fetch sets may be received by the circuit 142. Multiple signals (e.g., INa-INn) carrying the instruction words of a current fetch set may be generated by the circuit 142 and transferred to the circuit 144. A signal (e.g., PREFIX) containing the prefix word of the current fetch set may be transferred from the circuit 142 to the circuit 144. The circuit 144 may generate a signal (e.g., ES) conveying the execution sets to the circuit 146. A signal (e.g., DI) containing the decoded instructions may be generated and presented by the circuit 146.

The circuit 142 may implement the fetch set buffer circuit. The circuit 142 is generally operational to store multiple fetch sets received from the instruction memory 92 via the signal FS. The circuit 142 may also be operational to present the prefix word and the instruction words in a current fetch set (e.g., a current line being read from the buffer) in the signals PREFIX and INa-INn, respectively.

The circuit 144 may implement a multiplex circuit. The circuit 144 is generally operational to extract the instruction words belonging to the different variable length execution sets based on the symbols in the signal PREFIX. Each extracted group of instruction words may be referred to as an execution set. The multiplexing may identify each symbol in each of the fetch sets having the start value to identify where a current execution set begins and a previous execution set ends. Once the boundaries between execution sets are known, the circuit 144 may parse (or multiplex) the instructions words in the current fetch set into the execution sets. The parsed execution sets may be presented in the signal ES to the circuit 146.

The circuit 146 may implement an instruction decoder circuit. The circuit 146 is generally operational to decode each of the instruction words received in the signal ES. The decoded instructions may be presented in the signal DI to other circuits in the DSP core circuit for data addressing and execution. In some embodiments, the circuit 146 may be a single decoder circuit, rather than multiple parallel decoders in common designs. The single decoder implementation generally allows for smaller use of the integrated circuit area and lower power operations.

Figure 6:
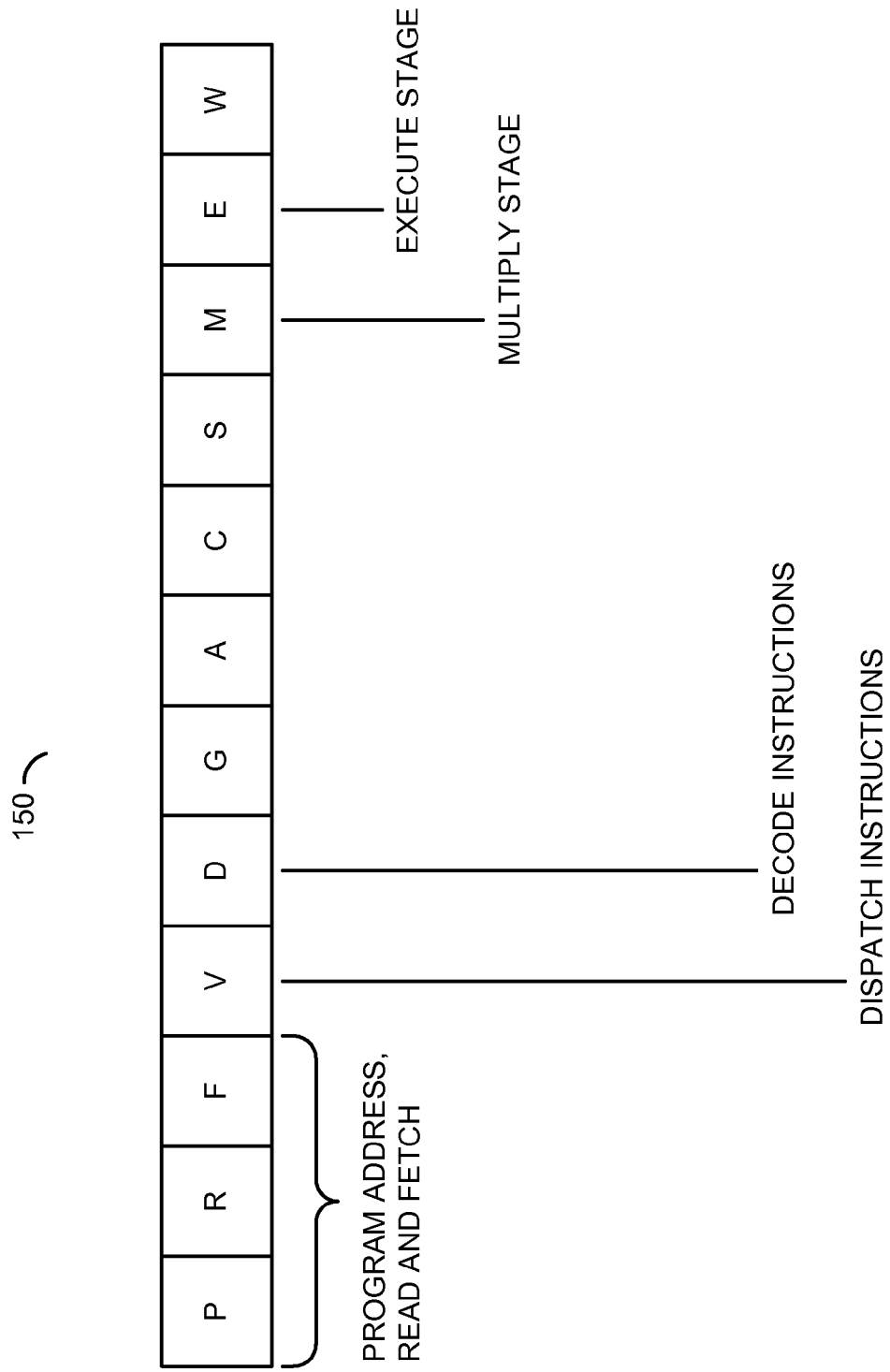
FIG. 6 is a block diagram of an example pipeline.

Referring to FIG. 6, a block diagram of an example pipeline 150 is shown. The pipeline 150 generally comprises multiple stages (e.g., P, R, F, V, D, G, A, C, S, M, E and W). The pipeline may be implemented by the circuits 94 and 100.

The stage P may implement a program address stage. During the stage P, the fetch set of addresses may be driven via the signal PSA along with a read strobe (e.g., a prefetch operation) by the circuit 122. Driving the address onto the signal PSA may enable the memory read process. While the address is being issued from the circuit 94 to the circuit 92, the stage P may update the fetch counter for the next program memory read.

The stage R may implement a read memory stage. In the stage R, the circuit 94 may access the circuit 92 for program instructions. The access may occur via the memory bus.

The stage F may implement a fetch stage. During the stage F, the circuit 94 generally sends the instruction set to the circuit 100. The circuit 100 may write the instruction set to local registers in the circuit 110.

The stage V may implement the VLES dispatch stage. During the stage V, the circuit 110 may parse the execution sets from the fetch sets based on the prefix words. The circuit 110 may also decode the prefix words in the stage V.

The stage D may implement a decode stage. During the stage D, the circuit 110 may decode the instructions in the execution sets. The decoded instructions may be displaced to the different execution units via the instruction bus.

The stage G may implement a generate address stage. During the stage G, the circuit 110 may precalculate a stack pointer and a program counter. The circuit 112 may generate a next address for both one or more data address (for load and for store) operations and a program address (e.g., change of flow) operation.

The stage A may implement an address to memory stage. During the stage A, the circuit 124 may send the data address to the circuit 94 via the signal MA. The circuit 112 may also process arithmetic instructions, logic instructions and/or bit-masking instructions (or operations).

The stage C may implement an access memory stage. During the stage C, the circuit 94 may access the data portion of the circuit 92 for load (read) operations. The requested data may be transferred from the circuit 92 to the circuit 94 during the stage C.

The stage S may implement a sample memory stage. During the stage S, the circuit 94 may send the requested data to the circuit 130 via the signal MRD.

The stage M may implement a multiply stage. During the stage M, the circuit 114 may process and distribute the read data now buffered in the circuit 130. The circuit 132 may perform an initial portion of a multiply-and-accumulate execution. The circuit 100 may also move data between the registers during the stage M.

The stage E may implement an execute stage. During the stage E, the circuit 132 may complete another portion of any multiply-and-accumulate execution already in progress. The circuit 114 may complete any bit-field operations still in progress. The circuit 132 may complete any ALU operations in progress. A combination of the stages M and E may be used to execute (e.g., step 56) the decoded instruction words received via the instruction bus.

The stage W may implement a write back stage. During the stage W, the circuit 114 may return any write data generated in the earlier stages from the circuit 130 to the circuit 94 via the signal MWD. Once the circuit 94 has received the write memory address and the write data from the circuit 100, the circuit 94 may execute the write (store) operation. Execution of the write operation may take one or more processor cycles, depending on the design of the circuit 90.

The functions performed by the diagrams of FIGS. 2-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a buffer configured to store a plurality of fetch sets as received in a fetch set order from an instruction memory, wherein (i) each of said fetch sets comprises a prefix word and a plurality of instruction words, (ii) each of said prefix words comprises a plurality of symbols and (iii) each of said symbols corresponds to a respective one of said instruction words; and
    a circuit configured to (i) identify each of said symbols in each of said fetch sets having a predetermined value and (ii) parse said fetch sets into a plurality of execution sets in response to said symbols having said predetermined value, wherein each of said symbols has (a) said predetermined value to identify an initial one of said instruction words in a respective one of said execution sets and (b) another value to identify a subsequent one of said instruction words after said initial instruction in said respective execution sets.

2. The apparatus according to claim 1, wherein each of said execution sets comprises a variable length execution set.

3. The apparatus according to claim 1, further comprising a single decoder, wherein said circuit is further configured to route said execution sets to said decoder in response to said prefix words.

4. The apparatus according to claim 1, further comprising a single decoder configured to generate one or more decoded instructions by decoding said execution sets.

5. The apparatus according to claim 4, wherein said decoded instructions are dispatched from said decoder to a plurality of execution units.

6. The apparatus according to claim 5, wherein said decoded instructions generated from each of said execution sets are dispatched to different ones of said execution units.

7. The apparatus according to claim 1, wherein each of said symbols having said predetermined value corresponds to a respective one of said execution sets.

8. The apparatus according to claim 1, wherein each of said symbols is a single bit, one of said bits per said instruction words respectively.

9. The apparatus according to claim 1, wherein said apparatus is implemented in a pipeline of a digital signal processor.

10. The apparatus according to claim 1, wherein said apparatus is implemented as one or more integrated circuits.

11. A method for an efficient extraction of a plurality of execution sets from a plurality of fetch sets, comprising the steps of:
    (A) storing said fetch sets in a buffer as received in a fetch set order from an instruction memory, wherein (i) each of said fetch sets comprises a prefix word and a plurality of instruction words, (ii) each of said prefix words comprises a plurality of symbols and (iii) each of said symbols corresponds to a respective one of said instruction words;
    (B) identifying each of said symbols in each of said fetch sets having a predetermined value; and
    (C) parsing said fetch sets into said execution sets in response to said symbols having said predetermined value, wherein each of said symbols has (i) said predetermined value to identify an initial one of said instruction words in a respective one of said execution sets and (ii) another value to identify a subsequent one of said instruction words after said initial instruction in said respective execution sets.

12. The method according to claim 11, wherein each of said execution sets comprises a variable length execution set.

13. The method according to claim 11, further comprising the step of:
    routing said execution sets to a single decoder in response to said prefix words.

14. The method according to claim 11, further comprising the step of:
    generating one or more decoded instructions by decoding said execution sets using a single decoder.

15. The method according to claim 14, further comprising the step of:
    dispatching said decoded instructions from said decoder to a plurality of execution units.

16. The method according to claim 15, wherein said decoded instructions generated from each of said execution sets are dispatched to different ones of said execution units.

17. The method according to claim 11, wherein each of said symbols having said predetermined value corresponds to a respective one of said execution sets.

18. The method according to claim 11, wherein each of said symbols is a single bit, one of said bits per said instruction words respectively.

19. The method according to claim 11, wherein said method is implemented in a pipeline of a digital signal processor.

20. An apparatus comprising:
    means for storing a plurality of fetch sets as received in a fetch set order from an instruction memory, wherein (i) each of said fetch sets comprises a prefix word and a plurality of instruction words, (ii) each of said prefix words comprises a plurality of symbols and (iii) each of said symbols corresponds to a respective one of said instruction words;
    means for identifying each of said symbols in each of said fetch sets having a predetermined value; and
    means for parsing said fetch sets into a plurality of execution sets in response to said symbols having said predetermined value, wherein each of said symbols has (i) said predetermined value to identify an initial one of said instruction words in a respective one of said execution sets and (ii) another value to identify a subsequent one of said instruction words after said initial instruction in said respective execution sets.

* * * * *